United States Patent
Lin et al.

(10) Patent No.: US 11,440,402 B2
(45) Date of Patent: Sep. 13, 2022

(54) CONTROL METHOD, VEHICLE FRAME, POWER DRIVING ASSEMBLY AND VEHICLE

(71) Applicant: Ninebot (Beijing) Tech Co., Ltd., Beijing (CN)

(72) Inventors: Ji Lin, Beijing (CN); Xingle Li, Beijing (CN); Yi Lou, Beijing (CN)

(73) Assignee: Ninebot (Beijing) Tech Co., Ltd., Beijing (CN)

( * ) Notice: Subject to any disclaimer, the term of this patent is extended or adjusted under 35 U.S.C. 154(b) by 374 days.

(21) Appl. No.: 16/610,926

(22) PCT Filed: Apr. 9, 2018

(86) PCT No.: PCT/CN2018/082368
§ 371 (c)(1),
(2) Date: Nov. 5, 2019

(87) PCT Pub. No.: WO2018/205785
PCT Pub. Date: Nov. 15, 2018

(65) Prior Publication Data
US 2020/0055393 A1    Feb. 20, 2020

(30) Foreign Application Priority Data
May 9, 2017    (CN) .......................... 201710321683.4

(51) Int. Cl.
*B60K 17/28*    (2006.01)
*B62K 11/00*    (2006.01)
(Continued)

(52) U.S. Cl.
CPC .............. *B60K 17/28* (2013.01); *B60K 17/34* (2013.01); *B60L 15/40* (2013.01); *B62K 5/01* (2013.01);
(Continued)

(58) Field of Classification Search
CPC .. B60K 17/28; B60K 17/34; B60K 2001/001; B60K 2001/0438; B60K 2001/0455;
(Continued)

(56) References Cited

U.S. PATENT DOCUMENTS

| 4,674,589 | A | 6/1987 | Szymkowiak | |
| 6,249,731 | B1 * | 6/2001 | Miller | B60K 28/16 |
| | | | | 701/48 |

(Continued)

FOREIGN PATENT DOCUMENTS

| CN | 202685901 U | 1/2013 |
| CN | 104648575 A | 5/2015 |

(Continued)

OTHER PUBLICATIONS

Corresponding KR application search results issued on Mar. 25, 2021.

(Continued)

*Primary Examiner* — Paul N Dickson
*Assistant Examiner* — Timothy Wilhelm
(74) *Attorney, Agent, or Firm* — Gang Yu

(57) ABSTRACT

Provided are a control method, a vehicle frame, a power driving assembly and a vehicle. The vehicle frame is configured to be connected with the power driving assembly, and the vehicle frame is provided with a manipulation assembly and a controller for controlling the power driving assembly. The control method includes that: after the vehicle frame is connected to the power driving assembly and a communication connection is established between the controller and the power driving assembly, the controller detects a manipulation instruction from the manipulation assembly; and in response to detecting the manipulation instruction from the manipulation assembly and determining that the manipulation instruction corresponds to the power driving (Continued)

assembly, the controller generates, according to the manipulation instruction, a control instruction for controlling the power driving assembly, and sends the control instruction to the power driving assembly.

16 Claims, 7 Drawing Sheets

(51) Int. Cl.
*B60L 15/40* (2006.01)
*B62K 5/01* (2013.01)
*B60K 17/34* (2006.01)

(52) U.S. Cl.
CPC ......... *B62K 11/007* (2016.11); *B62K 2202/00* (2013.01)

(58) Field of Classification Search
CPC .. B60K 1/00; B60K 1/04; B60K 28/16; B60L 15/40; B60L 2200/16; B60L 2200/20; B60L 2250/28; B60L 2260/34; B60L 2200/24; B60L 2250/26; B60L 2260/20; B62K 5/01; B62K 11/007; B62K 2202/00; B60R 16/0231; B60Y 2200/114; B60Y 2200/80; B60Y 2200/86; Y02T 90/16

See application file for complete search history.

(56) References Cited

U.S. PATENT DOCUMENTS

| | | | |
|---|---|---|---|
| 6,876,914 B2* | 4/2005 | Dubois | B60K 31/0058 701/93 |
| 7,438,148 B1* | 10/2008 | Crea | B62D 1/24 180/167 |
| 8,825,254 B2* | 9/2014 | Kobashi | B62K 1/00 701/22 |
| 9,399,398 B1* | 7/2016 | Logan | B62J 27/00 |
| 9,403,573 B1 | 8/2016 | Mazzei et al. | |
| 9,545,935 B2* | 1/2017 | Liberatore | B61L 3/127 |
| 9,682,309 B2* | 6/2017 | Huang | A63C 17/04 |
| 9,999,827 B2* | 6/2018 | Wood | G05D 1/0891 |
| 10,013,858 B2* | 7/2018 | Zerick | G08B 6/00 |
| 10,058,766 B2* | 8/2018 | Ma | A63C 17/12 |
| 10,134,269 B2* | 11/2018 | Xie | H04W 76/10 |
| 10,245,937 B2* | 4/2019 | Gillett | G05D 1/0231 |
| 10,611,261 B2* | 4/2020 | Pang | A63C 17/12 |
| 10,736,799 B1* | 8/2020 | Dickie | A61G 5/047 |
| 10,744,396 B2* | 8/2020 | Westfall | A63C 17/011 |
| 11,155,302 B1* | 10/2021 | Tacklind | A61G 5/1078 |
| 2008/0109237 A1* | 5/2008 | Suess | B60R 16/0231 705/1.1 |
| 2008/0295595 A1* | 12/2008 | Tacklind | B62K 3/005 73/462 |
| 2009/0248220 A1* | 10/2009 | Ecton | B61L 3/127 701/2 |
| 2015/0041230 A1* | 2/2015 | Lefebvre | A63G 25/00 180/167 |
| 2019/0248439 A1* | 8/2019 | Wang | B60L 53/305 |
| 2020/0122715 A1* | 4/2020 | Layfield | B62D 1/16 |
| 2020/0331554 A1* | 10/2020 | Monzidelis | B62K 13/08 |
| 2021/0146785 A1* | 5/2021 | Wang | B60L 15/20 |
| 2021/0293335 A1* | 9/2021 | Price | F16H 63/3491 |
| 2021/0403086 A1* | 12/2021 | Lomax | B62D 1/12 |

FOREIGN PATENT DOCUMENTS

| | | |
|---|---|---|
| CN | 204383685 U | 6/2015 |
| CN | 104943780 A | 9/2015 |
| CN | 204713266 U | 10/2015 |
| CN | 105292348 A | 2/2016 |
| CN | 105711713 A | 6/2016 |
| CN | 205345201 A | 6/2016 |
| CN | 205675154 U | 11/2016 |
| CN | 205737869 U | 11/2016 |
| CN | 106218781 A | 12/2016 |
| CN | 107161260 A | 9/2017 |
| DE | 19618161 C1 | 6/1997 |
| DE | 10000337 A | 9/2001 |
| JP | 2005-119349 A | 5/2005 |
| KR | 10-2008-0002993 A | 1/2008 |
| WO | 8904785 A | 6/1989 |

OTHER PUBLICATIONS

Corresponding JP application search results issued on Mar. 2, 2021.
Corresponding EP search report dated Dec. 23, 2020.

* cited by examiner

Fig. 1

After the vehicle frame is connected with the power driving assembly and a communication connection is established between the controller and the power driving assembly, the controller detects a manipulation instruction from the manipulation assembly — 101

In response to detecting the manipulation instruction from the manipulation assembly and determining that the manipulation instruction corresponds to the power driving assembly, the controller generates, according to the manipulation instruction, a control instruction for controlling the power driving assembly, and sends the control instruction to the power driving assembly — 102

Fig. 2

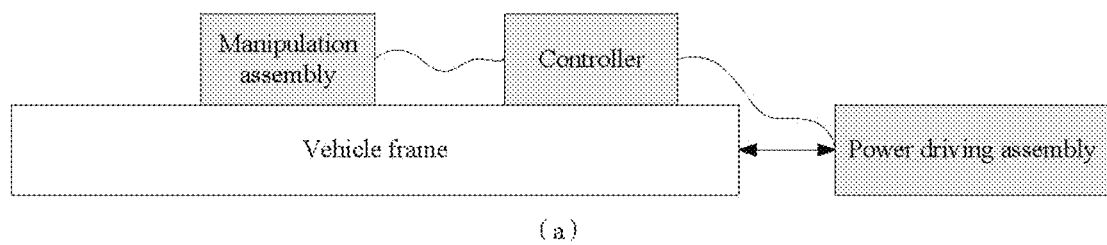

(a)

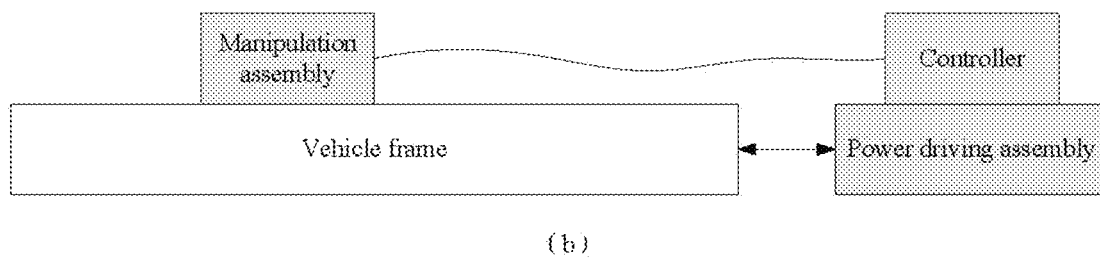

(b)

CONTROL METHOD, VEHICLE FRAME, POWER DRIVING ASSEMBLY AND VEHICLE

TECHNICAL FIELD

The present disclosure relates to a vehicle technology, and in particular to a control method, a vehicle frame, a power driving assembly and a vehicle.

BACKGROUND

Karts are widely applied due to their simple structure, high security and extremely high racing speed. However, the karts can only be used as tools on a racing track and have; certain requirements on sites, and therefore the use scenarios of the kart are relatively simple.

Self-balancing scooters are widely applied due to their small size, low energy consumption, capability of easing the traffic pressure, and high entertainment. However, for the sake of security, the self-balancing scooters can only be used as transportation tools and do not have racing features, and therefore, the use scenarios of the self-balancing scooters are relatively simple, too.

Both the karts and the self-balancing scooters can only be used by users as singled functioned vehicles, so the product utilization is low. If the users want to experience the two types of vehicles, they have to buy both the kart and the self-balancing scooter, which brings great economic pressure to consumers, and causes a resource waste.

SUMMARY

Embodiments of the present disclosure provide a control method, a vehicle frame, a power driving assembly and a vehicle, which may solve the above technical problems.

A control method provided by an, embodiment of the present disclosure is applied to a vehicle frame. The vehicle frame is configured to be connected with a power driving assembly, and the vehicle frame is provided with a manipulation assembly and a controller for controlling the power driving assembly. The method includes that:

after the vehicle frame is connected with the power driving assembly and a communication connection is established between the controller and the power driving assembly, the controller detects a manipulation instruction from the manipulation assembly; and in response to detecting the manipulation instruction from the manipulation assembly and determining that the manipulation instruction corresponds to the power driving assembly, the controller generates, according to the manipulation instruction, a control instruction for controlling the power driving assembly, and sends the control instruction to the power driving assembly.

A control method provided by another embodiment of the present disclosure is applied to a power driving assembly. The power driving assembly is configured to be connected with a vehicle frame. The vehicle frame is provided with a manipulation assembly. A controller for controlling the power driving assembly is set on the vehicle frame or on the power driving assembly. The method includes that:

after the power driving assembly is connected to the vehicle frame, the power driving assembly enters a first operating mode;

after a communication connection is established between the power driving assembly in the first operating mode and the controller, the power driving assembly in the first operating mode receives a control instruction from the controller; and the power driving assembly controls power output of the power driving assembly according to the received control instruction.

A vehicle frame provided by still another embodiment of the present disclosure is configured to be connected with a power driving assembly, and the vehicle frame is provided with a manipulation assembly and a controller for controlling the power driving assembly. After the vehicle frame is connected with the power driving assembly and a communication connection is established between the controller and the power driving assembly, the controller is configured to detect a manipulation instruction from the manipulation assembly, in response to detecting the manipulation instruction from the manipulation assembly and determining that the manipulation instruction corresponds to the power driving assembly, generate, according to the manipulation instruction, a control instruction for controlling the power driving assembly, and send the control instruction to the power driving assembly.

A power driving assembly provided by still another embodiment of the present disclosure is configured to be connected with a vehicle frame, the vehicle frame is provided with a manipulation assembly, and a controller for controlling the power driving assembly is set on the vehicle frame or on the power driving assembly. The power driving assembly includes: a processor and a power output assembly. After the power driving assembly is connected to the vehicle frame, the power driving assembly enters a first operating mode. When the power driving assembly is in the first operating state, the processor is configured to receive, after establishing communication connection with the controller, a control instruction from the controller, and control power output of the power output assembly according to the received control instruction.

In the technical solutions of the embodiments of the present disclosure, the vehicle frame is configured to be connected with the power driving assembly, and the vehicle frame is provided with a manipulation assembly and a controller for controlling the power driving assembly. After the power driving assembly is connected to the vehicle frame, the power driving assembly enters the first operating state. After a communication connection is established between the power driving assembly in the first operating mode and the controller, the power driving assembly in the first operating state receives a control instruction from the controller. The power driving assembly controls power output of the power driving assembly according to the received control instruction. After the power driving assembly is disconnected from the vehicle frame, the power driving assembly enters a second operating mode. The second operating mode is different from the first operating mode. In the second operating mode, the power driving assembly does not provide power output for the vehicle frame. By adopting the technical solutions of the embodiments of the present disclosure, functions of two types of vehicles are realized by one vehicle. When the power driving assembly is connected with the vehicle frame, the whole vehicle may realize the function of a kart and has a racing feature. When the power driving assembly is detached (i.e., disconnected) from the vehicle frame, the power driving assembly may realize the function of a self-balancing scooter, and has the function of a transportation tool. This type of vehicle with the functions of the kart and the self-balancing scooter greatly improves the product utilization, reduces economic pressure of consumers, and reduces the resource waste.

BRIEF DESCRIPTION OF THE DRAWINGS

FIG. 1 is a first flowchart of a control method according to an embodiment of the present disclosure.

FIG. 2 is a schematic diagram of connection between a vehicle frame and a power driving assembly according to an embodiment of the present disclosure.

DETAILED DESCRIPTION OF THE EMBODIMENTS

Figure 3:
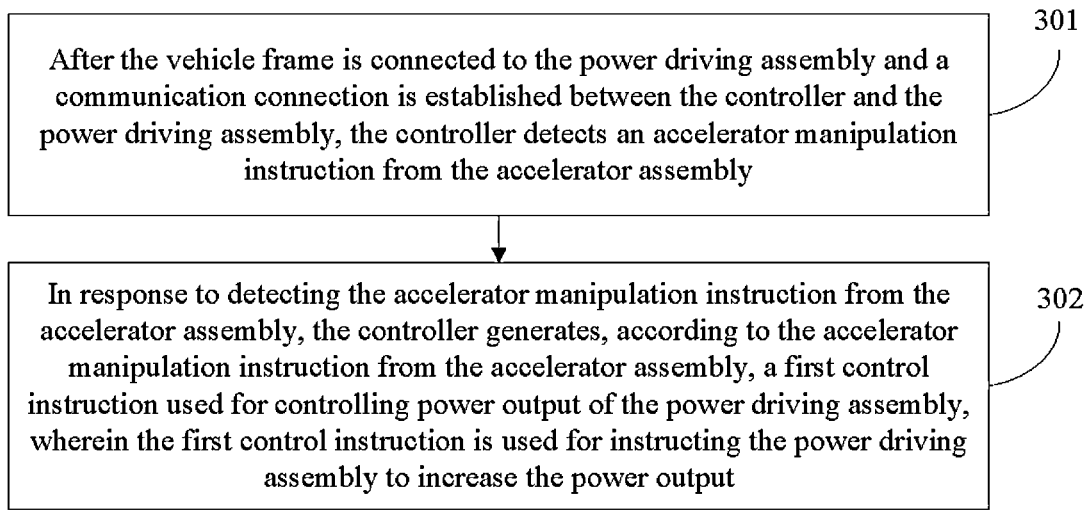
FIG. 3 is a second flowchart of the control method according to an embodiment of the present disclosure.

In order to understand characteristics and technical contents in the embodiments of the present disclosure in more detail, the implementation of the embodiments of the present disclosure is elaborated in combination with the accompanying drawings. The accompanying drawings are only used for reference, but not intended to limit the embodiments of the present disclosure.

FIG. 1 is a first flowchart of a control method according to an embodiment of the present disclosure. The control method in the embodiment is applied to a vehicle frame. The vehicle frame is configured to be connected with a power driving assembly, and the vehicle frame is provided with a manipulation assembly and a controller for controlling the power driving assembly. As illustrated in FIG. 1, the control method includes the following operations.

At S101, after the vehicle frame is connected with the power driving assembly and a communication connection is established between the controller and the power driving assembly, the controller detects a manipulation instruction from the manipulation assembly.

In the embodiment of the present disclosure, the vehicle frame is of a frame structure in bridge connection to the front and rear of a vehicle, and is the foundation of the vehicle. The vehicle frame functions in supporting and connecting various assemblies of the vehicle so that the various assemblies are kept in a relatively correct position relationship, and bears various loads in and outside the vehicle. As illustrated in (a) of FIG. 2, there is a controller and a manipulation assembly on the vehicle frame. The controller is in wired or wireless connection with the manipulation assembly. In an example, the controller is in wired connection with the manipulation assembly; for example, the controller and the manipulation assembly are connected by wires, and the wires may be hidden in the vehicle frame. In another example, the controller is in wireless connection with the manipulation assembly; for example, the controller and the manipulation assembly are connected by means of Bluetooth communication.

In the embodiment of the present disclosure, the manipulation assembly is any one or more assemblies capable of controlling the vehicle, such as a steering wheel, an accelerator, a brake, a gear lever, and a light control button. A user may manipulate the vehicle through the manipulation assembly. After obtaining an operation of the user, the manipulation assembly generates a corresponding manipulation instruction and sends the manipulation instruction to the controller for processing. After receiving the manipulation instruction, the controller controls a target object based on the manipulation instruction.

For example, in a case where the manipulation assembly is a steering wheel, when the user turns the steering wheel which is provided with a sensor capable of detecting a turned angle, the sensor can detect the turned angle of the steering wheel, and a direction manipulation instruction can be generated based on the turned angle and sent to the controller. After receiving the direction manipulation instruction, the controller determines a rotation angle of wheels, and controls the wheels to rotate, thereby realizing the control of the driving direction of the vehicle. It is to be noted that in another embodiment, the sensor capable of detecting the turned angle may also not be set on the steering wheel, the turning of the steering wheel is not used for controlling differential outputs of different wheels of the power driving assembly, but is only used for controlling the steering of the wheels except the power driving assembly, thereby changing the driving direction of the vehicle.

In the embodiments of the present disclosure, the vehicle frame is in detachable connection with the power driving assembly. In an application scenario, the vehicle frame is connected with the power driving assembly, then the vehicle frame and the power driving assembly are assembled into a vehicle; and the power driving assembly is in wired or wireless connection with the controller. In an example, the controller is in wired connection with the power driving assembly; for example, the controller and the power driving assembly are connected by the wires. In another example, the controller is in wireless connection with the power driving assembly; for example, the controller and the power driving assembly are connected by means of Bluetooth communication. In such a manner, communication channels are formed among the manipulation assembly, the controller and the power driving assembly. The action of the controller enables the user to use the manipulation assembly to manipulate the power driving assembly.

In the embodiments of the present disclosure, the connection mode between the vehicle frame and the power driving assembly is not limited. The power driving assembly may be buckled on the vehicle frame by means of a buckle. The power driving assembly may also be inserted on the vehicle frame by means of a slot. Of course, the power driving assembly may also be fixed on the vehicle frame by means of screws and rivets.

After the vehicle frame is connected with the power driving assembly and a communication connection is established between the controller and the power driving assembly, the controller detects a manipulation instruction from the manipulation assembly; for example, the controller detects an accelerator manipulation instruction from an accelerator, detects a brake instruction from a brake assembly, or detects a direction manipulation instruction from a direction manipulation assembly.

At S102, in response to detecting the manipulation instruction from the manipulation assembly and determining that the manipulation instruction corresponds to the power driving assembly, the controller generates, according to the manipulation instruction, a control instruction for controlling the power driving assembly, and sends the control instruction to the power driving assembly.

In the embodiments of the present disclosure, when detecting the manipulation instruction of the manipulation assembly, the controller first needs to determine the target object corresponding to the manipulation instruction, namely detecting which object the manipulation instruction needs to control. For example, when an instruction of switching on the headlight from the light control button is detected, it is determined that the object to be controlled is the headlight of the vehicle. For another example, when the direction manipulation instruction from the direction manipulation assembly is, detected, it is determined that the object to be controlled is the power driving assembly. For another example, when the accelerator manipulation instruction from the accelerator is detected, it is determined that the object to be controlled is the power driving assembly.

If it is determined that the manipulation instruction corresponds to the power driving assembly, the control instruction for controlling the power driving assembly is generated according to the manipulation instruction, and the control instruction is sent to the power driving assembly, thereby performing corresponding control to the power driving assembly.

In the embodiments of the present disclosure, the power driving assembly is used as a part of the vehicle. The user may conveniently use the manipulation assembly on the vehicle to control the power driving assembly through the controller, such as acceleration, deceleration or turning, so that the driving at a higher speed may be realized on the premise of the assurance of safety and reliability, and the user may use the vehicle to have racing entertainment.

The technical solutions of the embodiments of the present disclosure are described below in further detail with reference to the exemplary implementation mode of the manipulation assembly.

FIG. 3 is a second flowchart of the control method according to an embodiment of the present disclosure. The control method in the embodiment is applied to the vehicle frame. The vehicle frame is configured to be connected with the power driving assembly, and the vehicle frame is provided with a manipulation assembly and a controller for controlling the power driving assembly. The manipulation assembly includes the accelerator assembly. As illustrated in FIG. 3, the control method includes the following operations.

At S301, after the vehicle frame is connected to the power driving assembly and a communication connection is established between the controller and the power driving assembly, the controller detects an accelerator manipulation instruction from the accelerator assembly.

Figure 4:
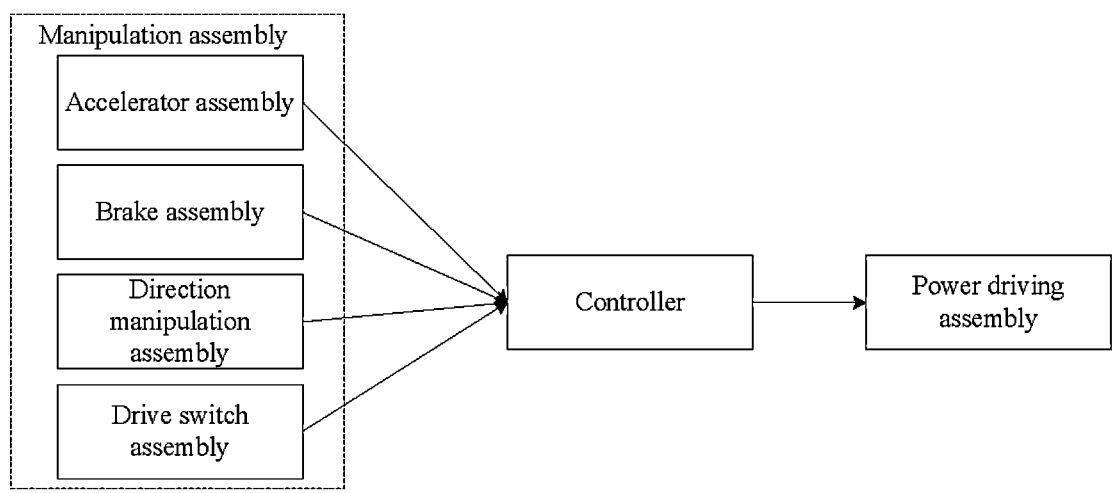
FIG. 4 is a schematic diagram of controlling, by a manipulation assembly, a power driving assembly through a controller according to an embodiment of the present disclosure.

In the embodiment of the present disclosure, as illustrated in FIG. 4, the manipulation assembly includes accelerator assembly. Of course, the manipulation assembly may also include other assemblies, such as the brake assembly, the direction manipulation assembly, and/or a drive switch assembly. The embodiment is illustrated by taking the accelerator assembly in the manipulation assembly for example.

In the embodiment of the present disclosure, the form of accelerator assembly is not limited. The accelerator assembly may be either a hand control accelerator or a foot control accelerator. By taking the hand control accelerator for example, the form of the accelerator may be a knob, then the user may control the accelerator by using the hand to turn the knob. By taking the foot control accelerator for example, the form of the accelerator may be a pedal, then the user may control the accelerator by applying different pressures to stamp on the pedal.

In the embodiment of the present disclosure, the accelerator assembly is in wired or wireless connection with the controller. In an example, the controller is in wired connection with the accelerator assembly, for example, the controller and the accelerator assembly are connected by the wires, and the wires may be hidden in the vehicle frame. In another example, the controller is in wireless connection with the accelerator assembly; for example, the controller and the accelerator assembly are connected by means of Bluetooth communication.

After the vehicle frame is connected to the power driving assembly and a communication connection is established between the controller and the power driving assembly, the controller detects the accelerator manipulation instruction from the accelerator assembly. Here, the accelerator manipulation instruction carries accelerator parameters. The accelerator parameters include, but are not limited to, a stamping force applied on an accelerator pedal, a stroke change of the accelerator pedal, and a rotation angle of the knob.

At S302, in response to detecting the accelerator manipulation instruction from the accelerator assembly, the controller generates, according to the accelerator manipulation instruction from the accelerator assembly, a first control instruction used for controlling power output of the power driving assembly. The first control instruction is used for instructing the power driving assembly to increase the power output.

In the embodiments of the present disclosure, in response to detecting the accelerator manipulation instruction from the accelerator assembly, the controller generates, according to the accelerator manipulation instruction from the accelerator assembly, the first control instruction used for controlling power output of the power driving assembly. Here, the accelerator manipulation instruction corresponds to the accelerator assembly, the first control instruction corresponds to the power driving assembly, and the controller aims to convert the accelerator manipulation instruction corresponding to the accelerator assembly into the first control instruction corresponding to the power driving assembly. In an exemplary implementation, if the accelerator parameter carried in the accelerator manipulation instruction corresponding to the accelerator assembly is A1, and a drive parameter carried in the first control instruction is A2, here, the drive parameters include, but are not limited to, the following parameters: a rotation speed of the power driving assembly and a rotation acceleration of the power driving assembly, then A2=F(A1), where F is a function, and F has different forms of expression according to the meanings represented by A1 and A2; for example, A1 represents the stamping force applied on the pedal, and A2 represents the rotation acceleration of the power driving assembly. In an implementation mode, A2=C×A1, where C is a constant, the greater the stamping force applied on the pedal, the higher the rotation acceleration of the power driving assembly. Here, no matter the rotation acceleration is high or low, the rotation acceleration represents that the power driving assembly increases the power output. The technical solutions of the embodiments of the present disclosure may use the accelerator assembly to instruct, through the controller, the power driving assembly to increase the power output.

Figure 5:
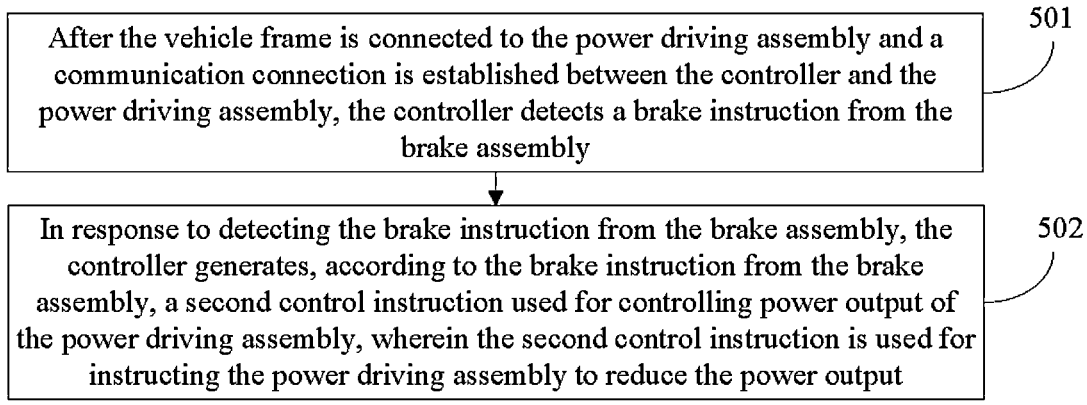
FIG. 5 is a third flowchart of the control method according to an embodiment of the present disclosure.

FIG. 5 is a third flowchart of the control method according to an embodiment of the present disclosure. The control method in the embodiment is applied to the vehicle frame. The vehicle frame is configured to be connected with the power driving assembly, and the vehicle frame is provided with a manipulation assembly and a controller for controlling the power driving assembly. The manipulation assembly includes a brake assembly. As illustrated in FIG. 5, the control method includes the following operations.

At S501, after the vehicle frame is connected to the power driving assembly and a communication connection is established between the controller and the power driving assembly, the controller detects a brake instruction from the brake assembly.

In the embodiment of the present disclosure, as illustrated in FIG. 4, the manipulation assembly includes the brake assembly. Of course, the manipulation assembly may also include other assemblies, such as the accelerator assembly, the direction manipulation assembly, and the drive switch assembly. The embodiment is illustrated by taking the brake assembly in the manipulation assembly for example.

In the embodiment of the present disclosure, the form of brake assembly is not limited. The brake assembly may be either a hand control brake or a foot control brake.

In the embodiment of the present disclosure, the brake assembly is in wired or wireless connection with the controller. In an example, the controller is in wired connection with the accelerator assembly, for example, the controller and the accelerator assembly are connected by the wires, and the wires may be hidden in the vehicle frame. In another example, the controller is in wireless connection with the brake assembly; for example, the controller and the brake assembly are connected by means of Bluetooth communication.

After the vehicle frame is connected to the power driving assembly and a communication connection is established between the controller and the power driving assembly, the controller detects the brake instruction from the brake assembly. Here, the brake instruction carries brake force parameters. The brake force parameters include, but are not limited to, the following parameters: a stamping force applied on a brake pedal and a stroke change of the brake pedal.

At S502, in response to detecting the brake instruction from the brake assembly, the controller generates, according to the brake instruction from the brake assembly, a second control instruction used for controlling power output of the power driving assembly. The second control instruction is used for instructing the power driving assembly to reduce the power output.

In the embodiments of the present disclosure, in response to detecting the brake instruction from the brake assembly, the controller generates, according to the brake instruction from the brake assembly, the second control instruction used for controlling power output of the power driving assembly. Here, the brake instruction corresponds to the brake assembly, the second control instruction corresponds to the power driving assembly, and the controller aims to convert the brake instruction corresponding to the brake assembly into the second control instruction corresponding to the power driving assembly. In an exemplary implementation, if the brake force parameter carried in the brake instruction corresponding to the brake assembly is D1, and the drive parameter carried in the second control instruction is D2, here, the drive parameters include, but are not limited to, the following parameters: the rotation speed of the power driving assembly and a rotation deceleration of the power driving assembly, then D2=f(D1), where f is a function, and f has different forms of expression according to the meanings represented by D1 and D2; the greater the stamping force applied on the brake pedal, the higher the rotation deceleration of the power driving assembly. Here, no matter the rotation deceleration is high or low, the rotation deceleration represents that the power driving assembly reduces the power output. The technical solutions of the embodiments of the present disclosure may use the brake assembly to instruct, through the controller, the power driving assembly to reduce the power output.

Figure 6:
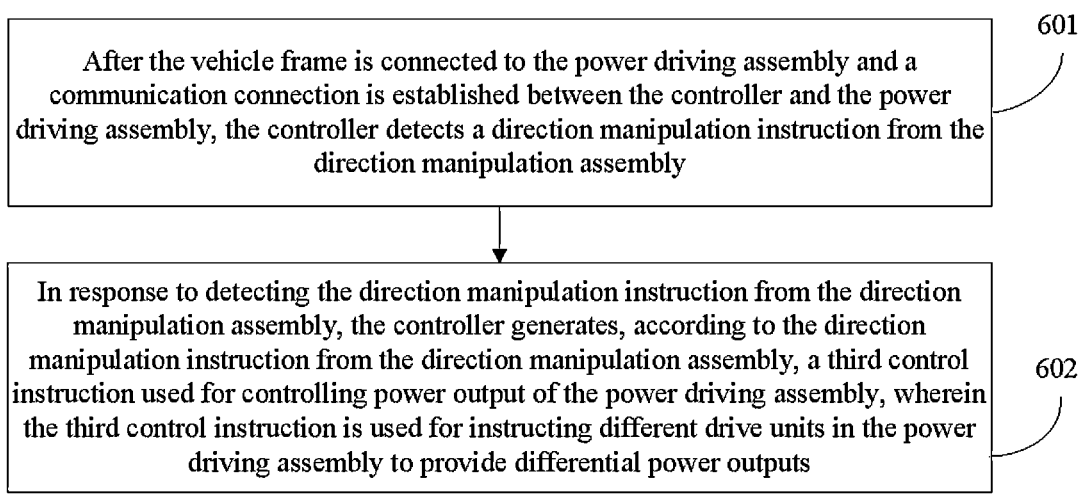
FIG. 6 is a fourth flowchart of the control method according to an embodiment of the present disclosure.

FIG. 6 is a fourth flowchart of the control method according to an embodiment of the present disclosure. The control method in the embodiment is applied to the vehicle frame. The vehicle frame is configured to be connected with the power driving assembly, and the vehicle frame is provided with a manipulation assembly and a controller for controlling the power driving assembly. The manipulation assembly includes a direction manipulation assembly. As illustrated in FIG. 6, the control method includes the following operations.

At S601, after the vehicle frame is connected to the power driving assembly and a communication connection is established between the controller and the power driving assembly, the controller detects a direction manipulation instruction from the direction manipulation assembly.

In the embodiment of the present disclosure, as illustrated in FIG. 4, the manipulation assembly includes the direction manipulation assembly. Of course, the manipulation assembly may also include other assemblies, such as the accelerator assembly, the brake assembly, and the drive switch assembly. The embodiment is illustrated by taking the direction manipulation assembly in the manipulation assembly for example.

In the embodiment of the present disclosure, the direction manipulation assembly may be in the form of the steering wheel, and the user may control the direction manipulation assembly by turning the steering wheel.

In the embodiment of the present disclosure, the direction manipulation assembly is in wired or wireless connection with the controller. In an example, the controller is in wired connection with the direction manipulation assembly, for example, the controller and the direction manipulation assembly are connected by the wires, and the wires may be hidden in the vehicle frame. In another example, the controller is in wireless connection with the direction manipulation assembly; for example, the controller and the direction manipulation assembly are connected by means of Bluetooth communication.

After the vehicle frame is connected to the power driving assembly and a communication connection is established between the controller and the power driving assembly, the controller detects the direction manipulation instruction from the direction manipulation assembly. Here, the direction manipulation instruction carries the turned angle of the steering wheel, and the direction manipulation assembly is provided with a sensor capable of detecting the turned angle of the steering wheel.

At S602, in response to detecting the direction manipulation instruction from the direction manipulation assembly, the controller generates, according to the direction manipulation instruction from the direction manipulation assembly, a third control instruction used for controlling power output of the power driving assembly. The third control instruction is used for instructing different drive units in the power driving assembly to provide differential power outputs.

In the embodiments of the present disclosure, in response to detecting the direction manipulation instruction from the direction manipulation assembly, the controller generates, according to the direction manipulation instruction from the direction manipulation assembly, the third control instruction used for controlling power output of the power driving assembly. Here, the direction manipulation instruction corresponds to the direction manipulation assembly, the third control instruction corresponds to the power driving assembly, and the controller aims to convert the direction manipulation instruction corresponding to the direction manipulation assembly into the third control instruction corresponding to the power driving assembly. In an exemplary implementation, if the turned angle carried in the direction manipulation instruction corresponding to the direction manipulation assembly is G1, and the drive parameter carried in the third control instruction is G2 (g1, g2), where g1 represents the rotation speed of the left drive unit in the power driving assembly, and g2 represents the rotation speed of the right drive unit in the power driving assembly, when g1 is greater than g2, the whole vehicle turns right; when g1 is less than g2, the whole vehicle turns left; and when g1 is equal to g2, the vehicle goes straight forward. The greater the turned angle G1, the greater the difference value between g1 and g2. Through the technical solutions of the embodiments of the present disclosure, the rotation speed of each drive unit in the power driving assembly is reasonably deduced according to the turned angle in the direction manipulation instruction, and then each of the drive units is controlled to rotate differentially (namely the power outputs) according to the corresponding rotation speed.

Figure 7:
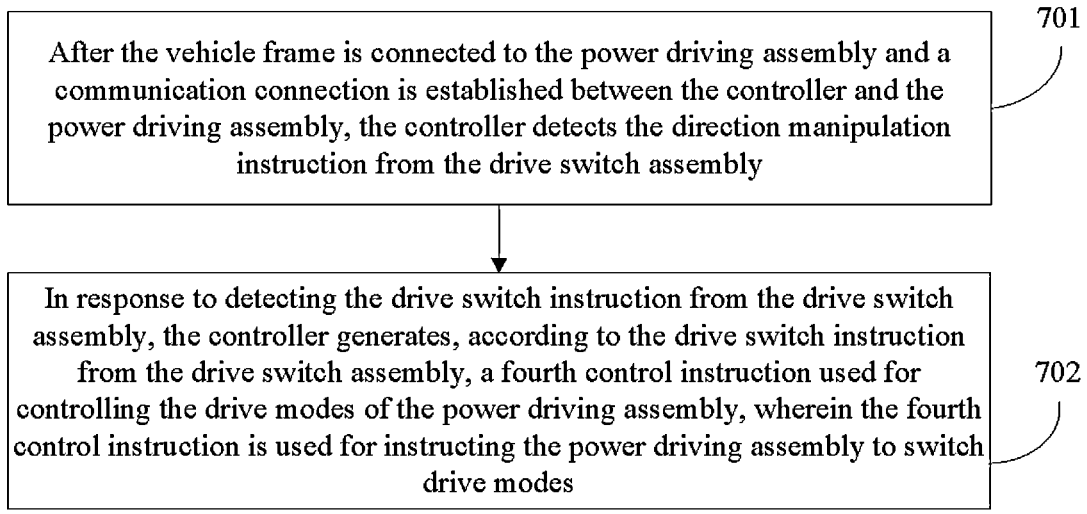
FIG. 7 is a fifth flowchart of the control method according to an embodiment of the present disclosure.

FIG. 7 is a fifth flowchart of the control method according to an embodiment of the present disclosure. The control method in the embodiment is applied to the vehicle frame. The vehicle frame is configured to be connected with the power driving assembly, and the vehicle frame is provided with a manipulation assembly and a controller for controlling the power driving assembly. The power driving assembly and the vehicle frame are connected in the following ways:

1) the power driving assembly is only connected to a front end of the vehicle frame, and serves as a front driving power assembly of the vehicle frame; or, 2) the power driving assembly is only connected to a rear end of the vehicle frame, and serves as a rear driving power assembly of the vehicle frame; or, 3) the power driving assembly connected to the front end of the vehicle frame serves as the front driving power assembly of the vehicle frame, and the power driving assembly connected to the rear end of the vehicle frame serves as the rear driving power assembly of the vehicle frame.

When the power driving assembly connected to the front end of the vehicle frame serves as the front driving power assembly of the vehicle frame, and the power driving assembly connected to the rear end of the vehicle frame serves as the rear driving power assembly of the vehicle frame, the manipulation assembly includes the drive switch assembly. As illustrated in FIG. 7, the control method includes the following operations.

At S701, after the vehicle frame is connected to the power driving assembly and a communication connection is established between the controller and the power driving assembly, the controller detects the direction manipulation instruction from the drive switch assembly.

In the embodiment of the present disclosure, as illustrated in FIG. 4, the manipulation assembly includes the drive switch assembly. Of course, the manipulation assembly may also include other assemblies, such as the accelerator assembly, the brake assembly, and the direction manipulation assembly. The embodiment is illustrated by taking the drive switch assembly in the manipulation assembly for example.

In the embodiment of the present disclosure, the drive switch assembly may be in the form of the button, and the user may control the drive switch assembly through the button.

In the embodiment of the present disclosure, the drive switch assembly is in wired or wireless connection with the controller. In an example, the controller is in wired connection with the drive switch assembly, for example, the controller and the drive switch assembly are connected by the wires, and the wires may be hidden in the vehicle frame. In another example, the controller is in wireless connection with the drive switch assembly; for example, the controller and the drive switch assembly are connected by means of Bluetooth communication.

After the vehicle frame is connected to the power driving assembly and a communication connection is established between the controller and the power driving assembly, the controller detects the drive switch instruction from the drive switch assembly. Here, the drive switch instruction carries the drive modes to be switched. The drive modes at least include: a first drive mode, a second drive mode and a third drive mode. In the first drive mode, the power driving assembly only connected to the front end of the vehicle frame provides the power output. In the second drive mode, the power driving assembly only connected to the rear end of the vehicle frame provides the power output. In the third drive mode, both the power driving assembly connected to the front end of the vehicle frame and the power driving assembly connected to the rear end of the vehicle frame provide the power output.

At S702, in response to detecting the drive switch instruction from the drive switch assembly, the controller generates, according to the drive switch instruction from the drive switch assembly, a fourth control instruction used for controlling the drive modes of the power driving assembly. The fourth control instruction is used for instructing the power driving assembly to switch the drive modes.

In the embodiment of the present disclosure, in response to detecting the drive switch instruction from the drive switch assembly, the controller generates, according to the drive switch instruction from the drive switch assembly, the fourth control instruction used for controlling the drive modes of the power driving assembly.

If the drive switch instruction carries the first drive mode, the fourth control instruction controls the power driving assembly on the front end of the vehicle frame to be in a driving state. Here, the power driving assembly is in the driving state means the power driving assembly may provide the power output.

If the drive switch instruction carries the second drive mode, the fourth control instruction controls the power driving assembly on the rear end of the vehicle frame to be in the driving state.

If the drive switch instruction carries the third drive mode, the fourth control instruction controls the power driving assemblies on the front end and the rear end of the vehicle frame to be in the driving state at the same time.

Figure 8:
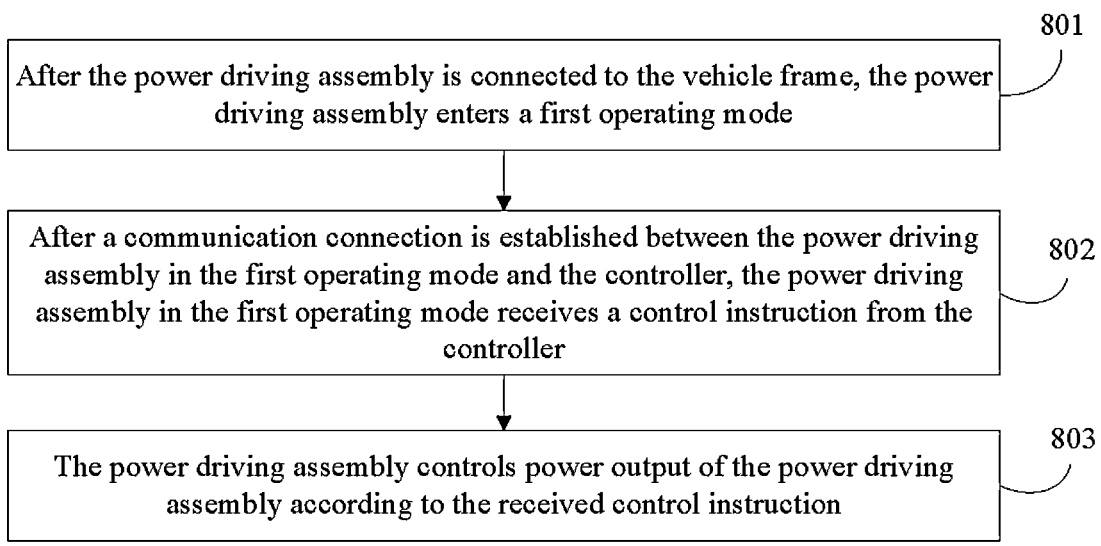
FIG. 8 is a sixth flowchart of the control method according to an embodiment of the present disclosure.

FIG. 8 is a sixth flowchart of the control method according to an embodiment of the present disclosure. The control method in the embodiment is applied to the power driving assembly. The power driving assembly is configured to be connected with the vehicle frame. The vehicle frame is provided with the manipulation assembly. The controller for controlling the power driving assembly is set on the vehicle frame or on the power driving assembly. As illustrated in FIG. 8, the control method includes the following operations.

At S801, after the power driving assembly is connected to the vehicle frame, the power driving assembly enters a first operating mode.

In the embodiment of the present disclosure, the vehicle frame is of a frame structure in bridge connection to the front and rear of a vehicle, and is the foundation of the vehicle. The vehicle frame functions in supporting and connecting various assemblies of the vehicle so that the various assemblies are kept in a relatively correct position relationship, and bears various loads in and outside the vehicle.

In an implementation mode, as illustrated in (a) of FIG. 2, there is the controller used for controlling the power driving assembly and the manipulation assembly on the vehicle frame. The controller is in wired or wireless connection with the manipulation assembly. In an example, the controller is in wired connection with the manipulation assembly; for example, the controller and the manipulation assembly are connected by wires, and the wires may be hidden in the vehicle frame. In another example, the controller is in wireless connection with the manipulation assembly; for example, the controller and the manipulation assembly are connected by means of Bluetooth communication.

In another implementation mode, as illustrated in (b) of FIG. 2, there is the manipulation assembly on the vehicle frame, and there is the controller used for controlling the power driving assembly on the power driving assembly. The controller is in wired or wireless connection with the manipulation assembly. In an example, the controller is in wired connection with the manipulation assembly; for example, the controller and the manipulation assembly are connected by the wires. In another example, the controller is in wireless connection with the manipulation assembly; for example, the controller and the manipulation assembly are connected by means of Bluetooth communication.

In the embodiment of the present disclosure, the manipulation assembly is any one or more assemblies capable of controlling the vehicle, such as a steering wheel, an accelerator, a brake, a gear lever, and a light control button. A user may manipulate the vehicle through the manipulation assembly. After obtaining an operation of the user, the manipulation assembly generates a corresponding manipulation instruction and sends the manipulation instruction to the controller for processing. After receiving the manipulation instruction, the controller controls a target object based on the manipulation instruction.

For example, in a case where the manipulation assembly is a steering wheel, when the user turns the steering wheel which is provided with a sensor capable of detecting a turned angle, the sensor can detect the turned angle of the steering wheel, and a direction manipulation instruction can be generated based on the turned angle and sent to the controller. After receiving the direction manipulation instruction, the controller determines a rotation angle of wheels, and controls the wheels to rotate, thereby realizing the control of the driving direction of the vehicle. It is to be noted that in another embodiment, the sensor capable of detecting the turned angle may also not be set on the steering wheel, the turning of the steering wheel is not used for controlling differential outputs of different wheels of the power driving assembly, but is only used for controlling the steering of the wheels except the power driving assembly, thereby changing the driving direction of the vehicle.

In the embodiments of the present disclosure, the vehicle frame is in detachable connection with the power driving assembly. In an application scenario, the vehicle frame is connected with the power driving assembly, then the vehicle frame and the power driving assembly are assembled into a vehicle.

In the embodiments of the present disclosure, the connection mode between the vehicle frame and the power driving assembly is not limited. The power driving assembly may be buckled on the vehicle frame by means of the buckle. The power driving assembly may also be inserted on the vehicle frame by means of the slot. Of course, the power driving assembly may also be fixed on the vehicle frame by means of the screws and rivets.

In the embodiment of the present disclosure, the power driving assembly has two operating states. After the power driving assembly is connected to the vehicle frame, the power driving assembly enters the first operating state. After the power driving assembly is disconnected from the vehicle frame, the power driving assembly enters the second operating mode.

At S802, after a communication connection is established between the power driving assembly in the first operating mode and the controller, the power driving assembly in the first operating mode receives a control instruction from the controller.

In an implementation mode, the controller is set on the vehicle frame, and the power driving assembly is in wired or wireless connection with the controller. In an example, the controller is in wired connection with the power driving assembly; for example, the controller and the power driving assembly are connected by the wires. In another example, the controller is in wireless connection with the power driving assembly; for example, the controller and the power driving assembly are connected by means of Bluetooth communication. In such a manner, communication channels are formed among the manipulation assembly, the controller and the power driving assembly. The action of the controller enables the user to use the manipulation assembly to manipulate the power driving assembly.

In another implementation mode, the controller is set on the power driving assembly, and the controller on the power driving assembly is in wired or wireless connection with the manipulation assembly on the vehicle frame. In such a manner, the communication channel is formed between the manipulation assembly and the controller in the power driving assembly. The action of the controller enables the user to use the manipulation assembly to manipulate the power driving assembly.

At S803, the power driving assembly controls power output of the power driving assembly according to the received control instruction.

In the embodiment of the present disclosure, as illustrated in FIG. 4, the manipulation assemblies include the accelerator assembly, the brake assembly, the direction manipulation assembly, the drive switch assembly, and so on. The implementation of each manipulation assembly is illustrated below.

In an implementation mode, the manipulation assemblies include the accelerator assembly. Correspondingly, that the power driving assembly controls power output of the power driving assembly according to the received control instruction includes that:

the power driving assembly receives the first control instruction from the controller, wherein the first control instruction is used for instructing the power driving assembly to increase the power output; and according to the first control instruction, a power increase strategy of the power driving assembly is determined, and the power driving assembly controls to increase the power output of the power driving assembly based on the power increase strategy.

In the embodiment of the present disclosure, the form of accelerator assembly is not limited. The accelerator assembly may be either the hand control accelerator or the foot control accelerator. By taking the hand control accelerator for example, the form of the accelerator may be a knob, then the user may control the accelerator by using the hand to turn the knob. By taking the foot control accelerator for example, the form of the accelerator may be a pedal, then the user may control the accelerator by applying different pressures to stamp on the pedal.

In the embodiment of the present disclosure, the accelerator assembly is in wired or wireless connection with the controller. In an example, the controller is in wired connection with the accelerator assembly, for example, the controller and the accelerator assembly are connected by the wires, and the wires may be hidden in the vehicle frame. In another example, the controller is in wireless connection with the accelerator assembly; for example, the controller and the accelerator assembly are connected by means of Bluetooth communication.

Here, the first control instruction carriers the drive parameters. The drive parameters include, but are not limited to, the following parameters: the rotation speed of the power driving assembly and the rotation acceleration of the power driving assembly. The power increase strategy corresponding to the first control instruction is that: the rotation speed and the rotation acceleration of each drive unit are controlled according to the drive parameters in the first control instruction.

In another implementation mode, the manipulation assemblies include the accelerator assembly. Correspondingly, that the power driving assembly controls power output of the power driving assembly according to the received control instruction includes that:

the power driving assembly receives the second control instruction from the controller, wherein the second control instruction is used for instructing the power driving assembly to reduce the power output; and according to the second control instruction, a power reduction strategy of the power driving assembly is determined, and the power driving assembly controls to reduce the power output of the power driving assembly based on the power reduction strategy.

In the embodiment of the present disclosure, the form of brake assembly is not limited. The brake assembly may be either the hand control brake or the foot control brake.

In the embodiment of the present disclosure, the brake assembly is in wired or wireless connection with the controller. In an example, the controller is in wired connection with the brake assembly, for example, the controller and the brake assembly are connected by the wires, and the wires may be hidden in the vehicle frame. In another example, the controller is in wireless connection with the brake assembly; for example, the controller and the brake assembly are connected by means of Bluetooth communication.

Here, the second control instruction carriers the drive parameters. The drive parameters include, but are not limited to, the following parameters: the rotation speed of the power driving assembly and the rotation deceleration of the power driving assembly. The power reduction strategy corresponding to the second control instruction is that: the rotation speed and the rotation deceleration of each drive unit are controlled according to the drive parameters in the second control instruction.

In yet another implementation mode, the manipulation assemblies include the direction manipulation assembly. Correspondingly, that the power driving assembly controls power output of the power driving assembly according to the received control instruction includes that:

the power driving assembly receives the third control instruction from the controller, wherein the third control instruction is used for instructing different drive units in the power driving assembly to provide differential power outputs; and a differential power output strategy of the power driving assembly is determined according to the third control instruction, and the different drive units in the power driving assembly are controlled, based on the differential power output strategy, to provide the differential power outputs.

In the embodiment of the present disclosure, the direction manipulation assembly may be in the form of the steering wheel, and the user may control the direction manipulation assembly by turning the steering wheel.

In the embodiment of the present disclosure, the direction manipulation assembly is in wired or wireless connection with the controller. In an example, the controller is in wired connection with the direction manipulation assembly, for example, the controller and the direction manipulation assembly are connected by the wires, and the wires may be hidden in the vehicle frame. In another example, the controller is in wireless connection with the direction manipulation assembly; for example, the controller and the direction manipulation assembly are connected by means of Bluetooth communication.

Here, the drive parameter carried in the third control instruction is G2 (g1, g2), where g1 represents the rotation speed of the left drive unit in the power driving assembly, and g2 represents the rotation speed of the right drive unit in the power driving assembly, when g1 is greater than g2, the whole vehicle turns right; when g1 is less than g2, the whole vehicle turns left; and when g1 is equal to g2, the vehicle goes straight ahead. The greater the turned angle of the steering wheel, the greater the difference value between g1 and g2.

In the embodiment of the present disclosure, the power driving assembly and the vehicle frame are connected in the following ways:

1) the power driving assembly is only connected to a front end of the vehicle frame, and serves as the front driving power assembly of the vehicle frame; or,
2) the power driving assembly is only connected to a rear end of the vehicle frame, and serves as the rear driving power assembly of the vehicle frame; or,
3) the power driving assembly connected to the front end of the vehicle frame serves as the front driving power assembly of the vehicle frame, and the power driving assembly connected to the rear end of the vehicle frame serves as the rear driving power assembly of the vehicle frame.

When the power driving assembly connected to the front end of the vehicle frame serves as the front driving power assembly of the vehicle frame, and the power driving assembly connected to the rear end of the vehicle frame serves as the rear driving power assembly of the vehicle frame, the power driving assembly receives the fourth control instruction from the controller. The fourth control instruction is used for instructing the power driving assembly to switch the drive modes. The drive modes at least include: the first drive mode, the second drive mode and the third drive mode. In the first drive mode, the power driving assembly only connected to the front end of the vehicle frame provides the power output. In the second drive mode; the power driving assembly only connected to the rear end of the vehicle frame provides the power output. In the third drive mode, both the power driving assembly connected to the front end of the vehicle frame and the power driving assembly connected to the rear end of the vehicle frame provide the power output.

Figure 9:
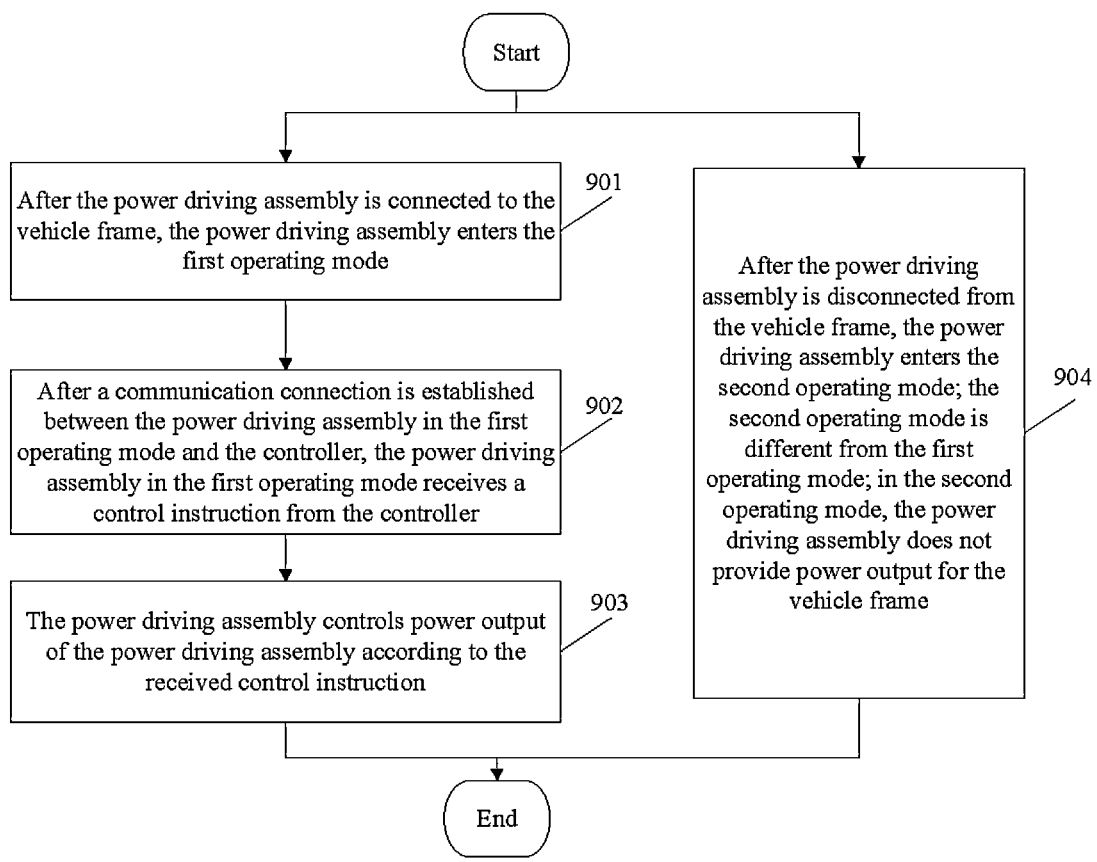
FIG. 9 is a seventh flowchart of the control method according to an embodiment of the present disclosure.

FIG. 9 is a seventh flowchart of the control method according to an embodiment of the present disclosure. The control method in the embodiment is applied to the power driving assembly. The power driving assembly is configured to be connected with the vehicle frame. The vehicle frame is provided with the manipulation assembly. The controller for controlling the power driving assembly is set on the vehicle frame or on the power driving assembly. As illustrated in FIG. 9, the control method includes the following operations.

At S901, after the power driving assembly is connected to the vehicle frame, the power driving assembly enters the first operating mode.

In the embodiment of the present disclosure, the vehicle frame is of a frame structure in bridge connection to the front and rear of a vehicle, and is the foundation of the vehicle. The vehicle frame functions in supporting and connecting various assemblies of the vehicle so that the various assemblies are kept in a relatively correct position relationship, and bears various loads in and outside the vehicle.

In an implementation mode, as illustrated in (a) of FIG. 2, there is the controller used for controlling the power driving assembly and the manipulation assembly on the vehicle frame. The controller is in wired or wireless connection with the manipulation assembly. In an example, the controller is in wired connection with the manipulation assembly; for example, the controller and the manipulation assembly are connected by wires, and the wires may be hidden in the vehicle frame. In another example, the controller is in wireless connection with the manipulation assembly; for example, the controller and the manipulation assembly are connected by means of Bluetooth communication.

In another implementation mode, as illustrated in (b) of FIG. 2, there is the manipulation assembly on the vehicle frame, and there is the controller used for controlling the power driving assembly on the power driving assembly. The controller is in wired or wireless connection with the manipulation assembly. In an example, the controller is in wired connection with the manipulation assembly; for example, the controller and the manipulation assembly are connected by the wires. In another example, the controller is in wireless connection with the manipulation assembly; for example, the controller and the manipulation assembly are connected by means of Bluetooth communication.

In the embodiment of the present disclosure, the manipulation assembly is any one or more assemblies capable of controlling the vehicle, such as a steering wheel, an accelerator, a brake, a gear lever, and a light control button. A user may manipulate the vehicle through the manipulation assembly. After obtaining an operation of the user, the manipulation assembly generates a corresponding manipulation instruction and sends the manipulation instruction to the controller for processing. After receiving the manipulation instruction, the controller controls a target object based on the manipulation instruction.

For example, in a case where the manipulation assembly is a steering wheel, when the user turns the steering wheel which is provided with a sensor capable of detecting a turned angle, the sensor can detect the turned angle of the steering wheel, and a direction manipulation instruction can be generated based on the turned angle and sent to the controller. After receiving the direction manipulation instruction, the controller determines a rotation angle of wheels, and controls the wheels to rotate, thereby realizing the control of the driving direction of the vehicle. It is to be noted that in another embodiment, the sensor capable of detecting the turned angle may also not be set on the steering wheel, the turning of the steering wheel is not used for controlling differential outputs of different wheels of the power driving assembly, but is only used for controlling the steering of the wheels except the power driving assembly, thereby changing the driving direction of the vehicle.

In the embodiments of the present disclosure, the vehicle frame is in detachable connection with the power driving assembly. In an application scenario, the vehicle frame is connected with the power driving assembly, then the vehicle frame and the power driving assembly are assembled into a vehicle.

In the embodiments of the present disclosure, the connection mode between the vehicle frame and the power driving assembly is not limited. The power driving assembly may be buckled on the vehicle frame by means of the buckle. The power driving assembly may also be inserted on the vehicle frame by means of the slot. Of course, the power driving assembly may also be fixed on the vehicle frame by means of the screws and rivets.

In the embodiment of the present disclosure, the power driving assembly has two operating states. After the power driving assembly is connected to the vehicle frame, the power driving assembly enters the first operating state. After the power driving assembly is disconnected from the vehicle frame, the power driving assembly enters the second operating mode.

At S902, after a communication connection is established between the power driving assembly in the first operating mode and the controller, the power driving assembly in the first operating mode receives a control instruction from the controller.

In an implementation mode, the controller is set on the vehicle frame, and the power driving assembly is in wired or wireless connection with the controller. In an example, the controller is in wired connection with the power driving assembly; for example, the controller and the power driving assembly are connected by the wires. In another example, the controller is in wireless connection with the power driving assembly; for example, the controller and the power driving assembly are connected by means of Bluetooth communication. In such a manner, communication channels are formed among the manipulation assembly, the controller and the power driving assembly. The action of the controller enables the user to use the manipulation assembly to manipulate the power driving assembly.

In another implementation mode, the controller is set on the power driving assembly, and the controller on the power driving assembly is in wired or wireless connection with the manipulation assembly on the vehicle frame. In such a manner, the communication channel is formed between the manipulation assembly and the controller in the power driving assembly. The action of the controller enables the user to use the manipulation assembly to manipulate the power driving assembly.

At S903, the power driving assembly controls power output of the power driving assembly according to the received control instruction.

In the embodiment of the present disclosure, as illustrated in FIG. 4, the manipulation assemblies include the accelerator assembly, the brake assembly, the direction manipulation assembly, the drive switch assembly, and so on. The implementation of each manipulation assembly is illustrated below.

In an implementation mode, the manipulation assemblies include the accelerator assembly. Correspondingly, that the power driving assembly controls power output of the power driving assembly according to the received control instruction includes that:

the power driving assembly receives the first control instruction from the controller, wherein the first control instruction is used for instructing the power driving assembly to increase the power output;

according to the first control instruction, a power increase strategy of the power driving assembly is determined, and the power driving assembly controls to increase the power output of the power driving assembly based on the power increase strategy.

In the embodiment of the present disclosure, the form of accelerator assembly is not limited. The accelerator assembly may be either the hand control accelerator or the foot control accelerator. By taking the hand control accelerator for example, the form of the accelerator may be a knob, then the user may control the accelerator by using the hand to turn the knob. By taking the foot control accelerator for example, the form of the accelerator may be a pedal, then the user may control the accelerator by applying different pressures to stamp on the pedal.

In the embodiment of the present disclosure, the accelerator assembly is in wired or wireless connection with the controller. In an example, the controller is in wired connection with the accelerator assembly, for example, the controller and the accelerator assembly are connected by the wires, and the wires may be hidden in the vehicle frame. In another example, the controller is in wireless connection with the accelerator assembly; for example, the controller and the accelerator assembly are connected by means of Bluetooth communication.

Here, the first control instruction carriers the drive parameters. The drive parameters include, but are not limited to, the following parameters: the rotation speed of the power driving assembly and the rotation acceleration of the power driving assembly. The power increase strategy corresponding to the first control instruction is that: the rotation speed and the rotation acceleration of each drive unit are controlled according to the drive parameters in the first control instruction.

In another implementation mode, the manipulation assemblies include the accelerator assembly. Correspondingly, that the power driving assembly controls power output of the power driving assembly according to the received control instruction includes that:

the power driving assembly receives the second control instruction from the controller, wherein the second control instruction is used for instructing the power driving assembly to reduce the power output;

according to the second control instruction, a power reduction strategy of the power driving assembly is determined, and the power driving assembly controls to reduce the power output of the power driving assembly based on the power reduction strategy.

In the embodiment of the present disclosure, the form of brake assembly is not limited. The brake assembly may be either the hand control brake or the foot control brake.

In the embodiment of the present disclosure, the brake assembly is in wired or wireless connection with the controller. In an example, the controller is in wired connection with the brake assembly, for example, the controller and the brake assembly are connected by the wires, and the wires may be hidden in the vehicle frame. In another example, the controller is in wireless connection with the brake assembly; for example, the controller and the brake assembly are connected by means of Bluetooth communication.

Here, the second control instruction carriers the drive parameters. The drive parameters include, but are not limited to, the following parameters: the rotation speed of the power driving assembly and the rotation deceleration of the power driving assembly. The power reduction strategy corresponding to the second control instruction is that: the rotation speed and the rotation deceleration of each drive unit are controlled according to the drive parameters in the second control instruction.

In yet another implementation mode, the manipulation assemblies include the direction manipulation assembly. Correspondingly, that the power driving assembly controls power output of the power driving assembly according to the received control instruction includes that:

the power driving assembly receives the third control instruction from the controller, wherein the third control instruction is used for instructing different drive units in the power driving assembly to provide differential power outputs; and a differential power output strategy of the power driving assembly is determined according to the third control instruction, and the different drive units in the power driving assembly are controlled, based on the differential power output strategy, to provide the differential power outputs.

In the embodiment of the present disclosure, the direction manipulation assembly may be in the form of the steering wheel, and the user may control the direction manipulation assembly by turning the steering wheel.

In the embodiment of the present disclosure, the direction manipulation assembly is in wired or wireless connection with the controller. In an example, the controller is in wired connection with the direction manipulation assembly, for example, the controller and the direction manipulation assembly are connected by the wires, and the wires may be hidden in the vehicle frame. In another example, the controller is in wireless connection with the direction manipulation assembly; for example, the controller and the direction manipulation assembly are connected by means of Bluetooth communication.

Here, the drive parameter carried in the third control instruction is G2 (g1, g2), where g1 represents the rotation speed of the left drive unit in the power driving assembly, and g2 represents the rotation speed of the right drive unit in the power driving assembly, when g1 is greater than g2, the whole vehicle turns right; when g1 is less than g2, the whole vehicle turns left; and when g1 is equal to g2, the vehicle goes straight ahead. The greater the turned angle of the steering wheel, the greater the difference value between g1 and g2.

In the embodiment of the present disclosure, the power driving assembly and the vehicle frame are connected in the following ways:

1) the power driving assembly is only connected to a front end of the vehicle frame, and serves as the front driving power assembly of the vehicle frame; or,
2) the power driving assembly is only connected to a rear end of the vehicle frame, and serves as the rear driving power assembly of the vehicle frame; or,
3) the power driving assembly connected to the front end of the vehicle frame serves as the front driving power assembly of the vehicle frame, and the power driving assembly connected to the rear end of the vehicle frame serves as the rear driving power assembly of the vehicle frame.

When the power driving assembly connected to the front end of the vehicle frame serves as the front driving power assembly of the vehicle frame, and the power driving assembly connected to the rear end of the vehicle frame serves as the rear driving power assembly of the vehicle frame, the power driving assembly receives the fourth control instruction from the controller. The fourth control instruction is used for instructing the power driving assembly to switch the drive modes. The drive modes at least include: the first drive mode, the second drive mode and the third drive mode. In the first drive mode, the power driving assembly only connected to the front end of the vehicle frame provides the power output. In the second drive mode, the power driving assembly only connected to the rear end of the vehicle frame provides the power output. In the third drive mode, both the power driving assembly connected to the front end of the vehicle frame and the power driving assembly connected to the rear end of the vehicle frame provide the power output.

At S904, after the power driving assembly is disconnected from the vehicle frame, the power driving assembly enters the second operating mode. The second operating mode is different from the first operating mode. In the second operating mode, the power driving assembly does not provide power output for the vehicle frame.

Here, the power driving assembly has a self-balancing system. In the first operating mode, the self-balancing system of the power driving assembly does not operate, and the power driving assembly provides power output for the vehicle frame. In the second operating mode, the self-balancing system of the power driving assembly operates.

In the embodiment of the present disclosure, the self-balancing system may detect the gravity center of human body, and control the power output of each drive unit in the power driving assembly according to the gravity center of human body, thereby realizing the following operations of the power driving assembly: going forward, going backward, turning and stopping. For example, when the gravity center of human body leans to the left, the self-balancing system controls the power driving assembly to turn left; when the gravity center of human body leans to the right, the self-balancing system controls the power driving assembly to turn right; when the gravity center of human body leans forward, the self-balancing system controls the power driving assembly to go forward; and when the gravity center of human body leans backward, the self-balancing system controls the power driving assembly to go backward or decelerate or stop.

Figure 10:
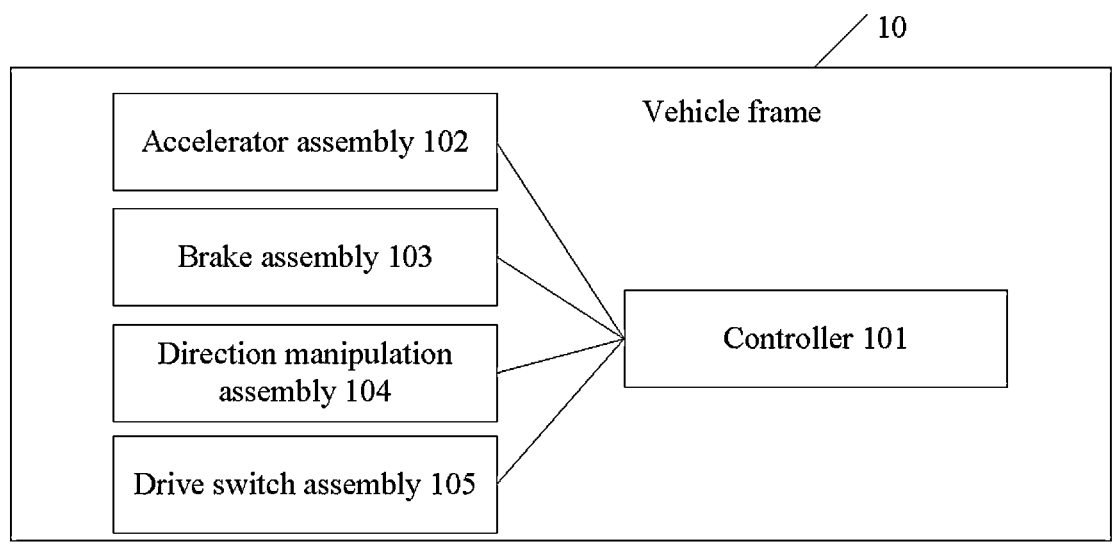
FIG. 10 is a first structure diagram of a vehicle frame according to an embodiment of the present disclosure.

FIG. 10 is a first structure diagram of the vehicle frame according to an embodiment of the present disclosure. As illustrated in FIG. 10, the vehicle frame 10 is configured to be connected with the power driving assembly, and the vehicle frame 10 is provided with the controller 101 for controlling the power driving assembly, and the manipulation assembly. After the vehicle frame 10 is connected to the power driving assembly, and the controller 101 is in communication connection with the power driving assembly, the controller 101 is configured to detect the manipulation instruction from the manipulation assembly, in response to detecting the manipulation instruction from the manipulation assembly and determining that the manipulation instruction corresponds to the power driving assembly, generate, according to the manipulation instruction, the control instruction for controlling the power driving assembly, and send the control instruction to the power driving assembly.

In an implementation mode, the manipulation assembly includes the accelerator assembly 102. The accelerator assembly 102 is connected with the controller 101.

The controller 101 is configured to generate, according to the accelerator manipulation instruction from the accelerator assembly 102, the first control instruction used for controlling power output of the power driving assembly. The first control instruction is used for instructing the power driving assembly to increase the power output.

In an implementation mode, the manipulation assembly includes the brake assembly 103. The brake assembly 103 is connected with the controller 101.

The controller 101 is configured to generate, according to the brake instruction from the brake assembly 103, the second control instruction used for controlling power output of the power driving assembly. The second control instruction is used for instructing the power driving assembly to reduce the power output.

In an implementation mode, the manipulation assembly includes the direction manipulation assembly 104. The direction manipulation assembly 104 is connected with the controller 101.

The controller 101 is configured to generate, according to the direction manipulation instruction from the direction manipulation assembly 104, the third control instruction used for controlling power output of the power driving assembly. The third control instruction is used for instructing the different drive units in the power driving assembly to provide differential power outputs.

In the embodiment of the present disclosure, the power driving assembly and the vehicle frame 10 are connected in the following ways:

1) the power driving assembly is only connected to a front end of the vehicle frame 10, and serves as a front driving power assembly of the vehicle frame 10; or,
2) the power driving assembly is only connected to a rear end of the vehicle frame 10, and serves as a rear driving power assembly of the vehicle frame 10; or,
3) the power driving assembly connected to the front end of the vehicle frame 10 serves as the front driving power assembly of the vehicle frame 10, and the power driving assembly connected to the rear end of the vehicle frame 10 serves as the rear driving power assembly of the vehicle frame 10.

When the power driving assembly connected to the front end of the vehicle frame 10 serves as the front driving power assembly of the vehicle frame 10, and the power driving assembly connected to the rear end of the vehicle frame 10 serves as the rear driving power assembly of the vehicle frame 10, the manipulation assembly includes the drive switch assembly 105. The drive switch assembly 105 is connected with the controller 101.

The controller 101 is configured to generate, according to the drive switch instruction from the drive switch assembly 105, the fourth control instruction used for controlling the drive modes of the power driving assembly. The fourth control instruction is used for instructing the power driving assembly to switch the drive modes.

The drive modes at least include: the first drive mode, the second drive mode and the third drive mode. In the first drive mode, the power driving assembly only connected to the front end of the vehicle frame 10 provides the power output. In the second drive mode, the power driving assembly only connected to the rear end of the vehicle frame 10 provides the power output. In the third drive mode, both the power driving assembly connected to the front end of the vehicle frame and the power driving assembly connected to the rear end of the vehicle frame 10 provide the power output.

Those skilled in the art should understand that the implemented function of each assembly in the vehicle frame illustrated in FIG. 10 may be understood with reference to the related description of the control method.

Figure 11:
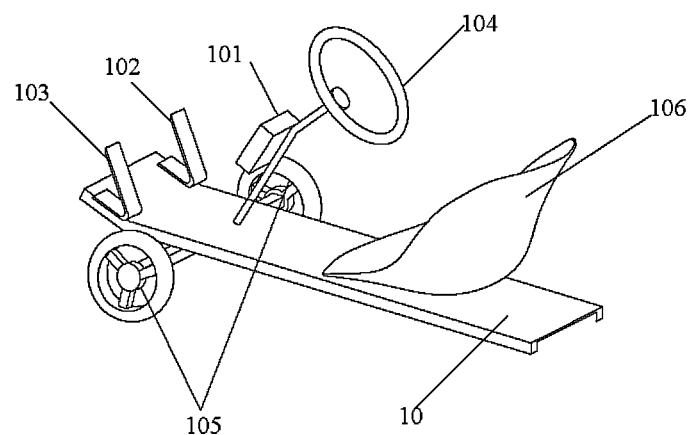
FIG. 11 is a second structure diagram of the vehicle frame according to an embodiment of the present disclosure.

Based on the vehicle frame illustrated in FIG. 10, the embodiments of the present disclosure also provide a vehicle frame with a specific shape. It is to be noted that the vehicle frame in the embodiments of the present disclosure is not limited to the shape illustrated in FIG. 11, and all the vehicle frames in any shape should fall within the protection scope of the present disclosure as long as they can implement the solutions of the embodiments of the present disclosure. As illustrated in FIG. 11, the vehicle frame 10 includes: the controller 101, the accelerator assembly 102, the brake assembly 103, the direction manipulation assembly 104, a front wheel assembly 105, and a chair assembly 106. Of course, the vehicle frame may also be provided with more assemblies, such as a display screen, a sound box, and a lamp.

Figure 12:
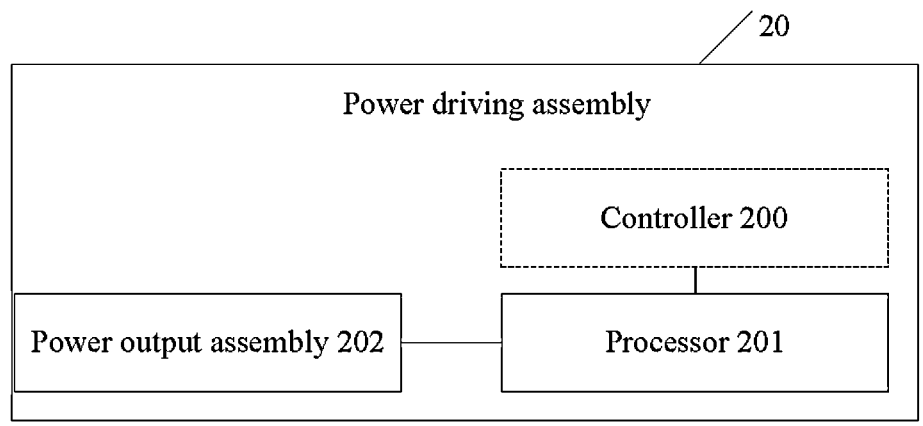
FIG. 12 is a first structure diagram of a power driving assembly according to an embodiment of the present disclosure.

FIG. 12 is a first structure diagram of the power driving assembly according to an embodiment of the present disclosure. As illustrated in FIG. 12, the power driving assembly 20 is configured to be connected with the vehicle frame, the vehicle frame is provided with the manipulation assembly, the controller 200 for controlling the power driving assembly is set on the vehicle frame or on the power driving assembly. The power driving assembly 20 includes: a processor 201 and a power output assembly 202. After the power driving assembly 20 is connected to the vehicle frame, the power driving assembly 20 enters the first operating mode. When the power driving assembly 20 is in the first operating state, the processor 201 is configured to receive, after establishing communication connection with the controller 200, the control instruction from the controller 200, and control the power output of the power output assembly 202 according to the received control instruction.

In the embodiments of the present disclosure, after the power driving assembly 20 is disconnected from the vehicle frame, the power driving assembly 20 enters the second operating mode. The second operating mode is different from the first operating mode. In the second operating mode, the power output assembly 202 does not provide power output for the vehicle frame.

In the embodiments of the present disclosure, the power driving assembly 20 has the self-balancing system. In the first operating mode, the self-balancing system of the power driving assembly 20 does not operate, and the power output assembly 202 provides the power output for the vehicle frame. In the second operating mode, the self-balancing system of the power driving assembly 20 operates.

In the embodiments of the present disclosure, the manipulation assembly includes the accelerator assembly.

The processor 201 is configured to receive the first control instruction from the controller 200. The first control instruction is used for instructing the power output assembly 202 to increase the power output, determine, according to the first control instruction, the power increase strategy of the power output assembly 202, and control the power output assembly 202 to increase the power output based on the power increase strategy.

In the embodiments of the present disclosure, the manipulation assembly includes the brake assembly.

The processor 201 is configured to receive the second control instruction from the controller 200. The second control instruction is used for instructing the power output assembly 202 to reduce the power output, determine, according to the second control instruction, the power reduction strategy of the power output assembly 202, and control the power output assembly 202 to reduce the power output based on the power reduction strategy.

In the embodiments of the present disclosure, the manipulation assembly includes the direction manipulation assembly.

The processor 201 is configured to receive the third control instruction from the controller 200. The third control instruction is used for instructing different drive units in the power output assembly 202 to provide differential power outputs, determine, according to the third control instruction, the differential power output strategy of the power output assembly 202, and control the different drive units in the power output assembly 202 to provide the differential power outputs based on the differential power output strategy.

In the embodiments of the present disclosure, the power driving assembly 20 is only connected to a front end of the vehicle frame, and serves as the front driving power assembly of the vehicle frame; or, the power driving assembly 20 is only connected to a rear end of the vehicle frame, and serves as the rear driving power assembly of the vehicle frame; or, the power driving assembly 20 connected to the front end of the vehicle frame serves as the front driving power assembly of the vehicle frame, and the power driving assembly 20 connected to the rear end of the vehicle frame serves as the rear driving power assembly of the vehicle frame.

In the embodiments of the present disclosure, when the power driving assembly 20 connected to the front end of the vehicle frame serves as the front driving power assembly of the vehicle frame, and the power driving assembly 20 connected to the rear end of the vehicle frame serves as the rear driving power assembly of the vehicle frame, the manipulation assembly includes the drive switch assembly.

The processor 201 is configured to receive the fourth control instruction from the controller 200. The fourth control instruction is used for instructing the power driving assembly 20 to switch the drive modes. The drive modes at least include: the first drive mode, the second drive mode and the third drive mode. In the first drive mode, the power driving assembly 20 only connected to the front end of the vehicle frame provides the power output. In the second drive mode, the power driving assembly 20 only connected to the rear end of the vehicle frame provides the power output. In the third drive mode, both the power driving assemblies 20 connected to the front end and the rear end of the vehicle frame provide the power output.

Figure 13:
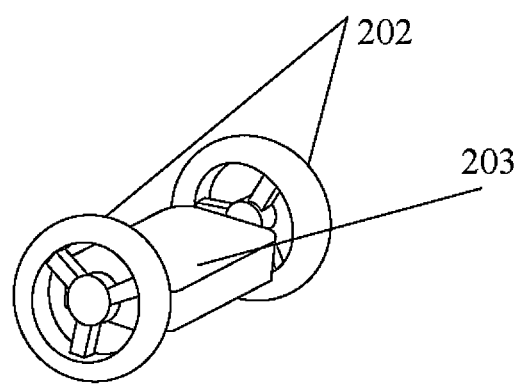
FIG. 13 is a second structure diagram of the power driving assembly according to an embodiment of the present disclosure.

Based on the vehicle frame illustrated in FIG. 12, the embodiments of the present disclosure also provide a power driving assembly with a specific shape. It is to be noted that the power driving assembly in the embodiments of the present disclosure is not limited to the shape illustrated in FIG. 13, and all the power driving assemblies in any shape should fall within the protection scope of the present disclosure as long as they can implement the solutions of the embodiments of the present disclosure. As illustrated in FIG. 13, the power driving assembly 20 includes: the processor (not illustrated), the power output assembly 202, the pedal 203, the self-balancing system (not illustrated), and a power supply (not illustrated). Of course, the power driving assembly may be more assemblies, such as an indicator light and a communication module.

Figure 14:
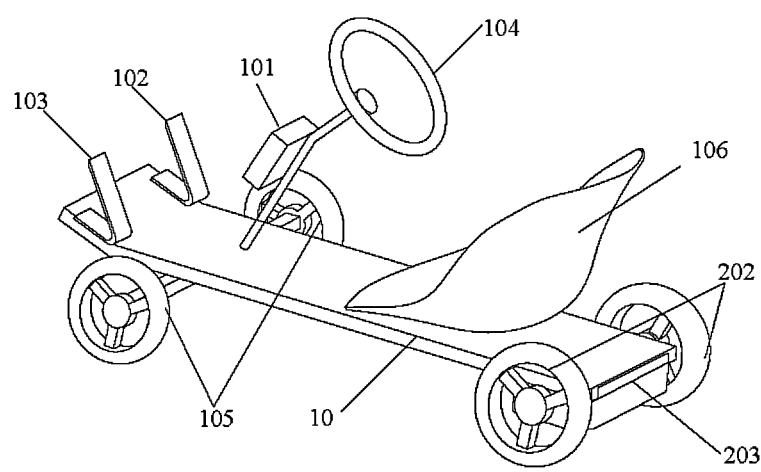
FIG. 14 is a first schematic diagram of a vehicle according to an embodiment of the present disclosure.
Figure 15:
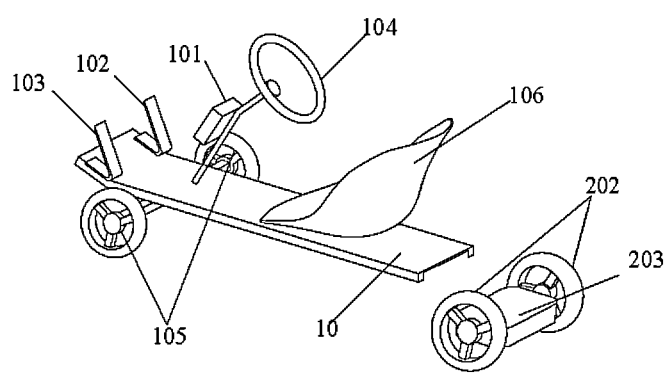
FIG. 15 is a second schematic diagram of the vehicle according to an embodiment of the present disclosure.

The embodiments of the present disclosure also provide a vehicle. The vehicle includes any above vehicle frame and power driving assembly. FIG. 14 and FIG. 15 are structure diagrams of a vehicle with a specific shape. It is to be noted that the vehicle in the embodiments of the present disclosure is not limited to the shapes illustrated in FIG. 14 and FIG. 15, and all the vehicles in any shape should fall within the protection scope of the present disclosure as long as they can implement the solutions of the embodiments of the present disclosure. As illustrated in FIG. 14 and FIG. 15, the vehicle includes: the vehicle frame 10 and the power driving assembly 20. The power driving assembly 20 is in detachable connection with the vehicle frame 10. The vehicle frame 10 includes: the controller 101, the accelerator assembly 102, the brake assembly 103, the direction manipulation assembly 104, the front wheel assembly 105, and the chair assembly 106. The power driving assembly 20 includes: the processor (not illustrated), the power output assembly 202, the pedal 203, the self-balancing system (not illustrated), and the power supply (not illustrated).

Figure 16:
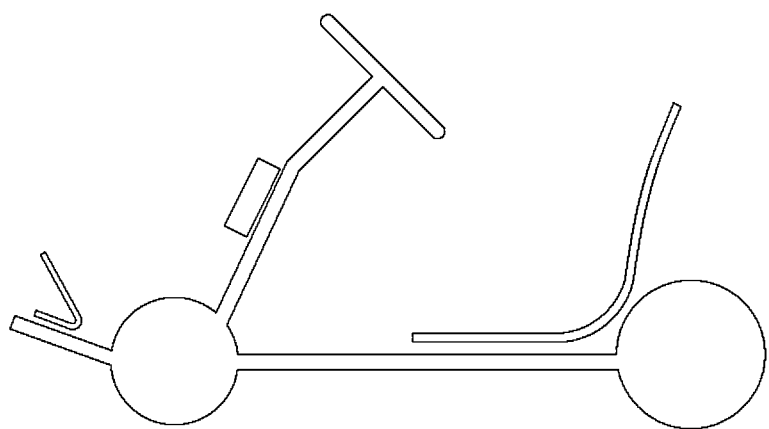
FIG. 16 is a third schematic diagram of the vehicle according to an embodiment of the present disclosure.

When the power driving assembly 20 is connected with the vehicle frame 10, the vehicle may be used as the kart. FIG. 16 is a lateral view of the vehicle. At this point, the self-balancing system of the power driving assembly 20 is turned off, and the power driving assembly 20 provides the power output for the vehicle under the control of the controller 101.

When the power driving assembly 20 is disconnected from the vehicle frame 10, the power driving assembly may be used as the self-balancing scooter; at this point, the self-balancing system of the power driving assembly 20 is turned on, and the user may use the power driving assembly 20 as a transportation tool.

The technical solutions recorded in the embodiments of the present disclosure may be combined arbitrarily without conflict.

In the several embodiments provided in the present disclosure, it should be understood that the methods and devices disclosed may be realized in other ways. The embodiments of devices described above are only demonstrative. In addition, coupling, direct coupling, or communication connection illustrated or discussed may be implemented through indirect coupling or communication connection of some interfaces, devices or units, and may be in an electrical form, a mechanical form or other forms.

The above is only the exemplary implementation modes of the present disclosure and not intended to limit the protection scope of the present disclosure; any change or replacement that those skilled in the art can think of easily in the scope of technologies disclosed by the present disclosure shall fall within the protection scope of the present disclosure.

What is claimed is:

1. A control method, being applied to a vehicle frame, wherein the vehicle frame is configured to be connected with a power driving assembly, and the vehicle frame is provided with a manipulation assembly and a controller for controlling the power driving assembly, the control method comprises:

after the vehicle frame is connected with the power driving assembly and a communication connection is established between the controller and the power driving assembly, detecting, by the controller, a manipulation instruction from the manipulation assembly; and in response to detecting the manipulation instruction from the manipulation assembly and determining that the manipulation instruction corresponds to the power driving assembly, generating, by the controller according to the manipulation instruction, a control instruction for controlling the power driving assembly, and sending, by the controller, the control instruction to the power driving assembly, wherein the vehicle frame is of a frame structure in bridge connection to the front and rear of a vehicle, and is in detachable connection with the power driving assembly which has a self-balancing system;

when the power driving assembly is connected with the vehicle frame, the controller is in wired connection or wireless connection with the power driving assembly, the self-balancing system of the power driving assembly does not operate, and the vehicle is used as a kart;

when the power driving assembly is disconnected from the vehicle frame, the self-balancing system of the power driving assembly operates, and the power driving assembly is used as a self-balancing scooter.

2. The control method as claimed in claim 1, wherein the manipulation assembly comprises an accelerator assembly; and generating, according to the manipulation instruction, the control instruction for controlling the power driving assembly comprises: generating, according to an accelerator manipulation instruction from the accelerator assembly, a first control instruction used for controlling power output of the power driving assembly, wherein the first control instruction is used for instructing the power driving assembly to increase the power output;

or, the manipulation assembly comprises a brake assembly; and generating, according to the manipulation instruction, the control instruction for controlling the power driving assembly comprises: generating, according to a brake instruction from the brake assembly, a second control instruction used for controlling power output of the power driving assembly, wherein the second control instruction is used for instructing the power driving assembly to reduce the power output;

or, the manipulation assembly comprises a direction manipulation assembly; and generating, according to the manipulation instruction, the control instruction for controlling the power driving assembly comprises: generating, according to a direction manipulation instruction from the direction manipulation assembly, a third control instruction used for controlling power output of the power driving assembly, wherein the third control instruction is used for instructing different drive units in the power driving assembly to provide differential power outputs.

3. A control method, being applied to a power driving assembly, wherein the power driving assembly is configured to be connected with a vehicle frame, the vehicle frame is provided with a manipulation assembly, and a controller for controlling the power driving assembly is set on the vehicle frame or on the power driving assembly, the method comprises:

after the power driving assembly is connected to the vehicle frame, entering, by the power driving assembly, a first operating mode;

after a communication connection is established between the power driving assembly in the first operating mode and the controller, receiving, by the power driving assembly in the first operating mode, a control instruction from the controller; and controlling, by the power driving assembly, power output of the power driving assembly according to the received control instruction, wherein the vehicle frame is of a frame structure in bridge connection to the front and rear of a vehicle, and is in detachable connection with the power driving assembly which has a self-balancing system;

when the power driving assembly is connected with the vehicle frame, the controller is in wired connection or wireless connection with the power driving assembly, the self-balancing system of the power driving assembly does not operate, and the vehicle is used as a kart;

when the power driving assembly is disconnected from the vehicle frame, the self-balancing system of the power driving assembly operates, and the power driving assembly is used as a self-balancing scooter.

4. The control method as claimed in claim 3, further comprising: after the power driving assembly is disconnected from the vehicle frame, entering, by the power driving assembly, a second operating mode, wherein the second operating mode is different from the first operating mode, and in the second operating mode, the power driving assembly does not provide power output for the vehicle frame.

5. The control method as claimed in claim 4, wherein the power driving assembly has a self-balancing system; in the first operating mode, the self-balancing system of the power driving assembly does not operate, and the power driving assembly provides power output for the vehicle frame; and in the second operating mode, the self-balancing system of the power driving assembly operates.

6. The control method as claimed in claim 3, wherein the manipulation assembly comprises an accelerator assembly; and controlling, by the power driving assembly, power output of the power driving assembly according to the received control instruction comprises: receiving, by the power driving assembly, a first control instruction from the controller, wherein the first control instruction is used for instructing the power driving assembly to increase the power output; and determining, according to the first control instruction, a power increase strategy of the power driving assembly, and controlling, by the power driving assembly, to increase the power output of the power driving assembly based on the power increase strategy;

or, the manipulation assembly comprises a brake assembly; and controlling, by the power driving assembly, power output of the power driving assembly according to the received control instruction comprises: receiving, by the power driving assembly, a second control instruction from the controller, wherein the second control instruction is used for instructing the power driving assembly to reduce the power output; and determining, according to the second control instruction, a power reduction strategy of the power driving assembly, and controlling, by the power driving assembly, to reduce the power output of the power driving assembly based on the power reduction strategy;

or, the manipulation assembly comprises a direction manipulation assembly; and controlling, by the power driving assembly, power output of the power driving assembly according to the received control instruction comprises: receiving, by the power driving assembly, a third control instruction from the controller, wherein the third control instruction is used for instructing different drive units in the power driving assembly to provide differential power outputs; and determining, according to the third control instruction, a differential power output strategy of the power driving assembly, and controlling the different drive units in the power driving assembly to provide the differential power outputs based on the differential power output strategy.

7. The control method as claimed in claim 3, wherein the power driving assembly is only connected to a front end of the vehicle frame, and serves as a front driving power assembly of the vehicle frame; or, the power driving assembly is only connected to a rear end of the vehicle frame, and serves as a rear driving power assembly of the vehicle frame; or, the power driving assembly connected to the front end of the vehicle frame serves as the front driving power assembly of the vehicle frame, and the power driving assembly connected to the rear end of the vehicle frame serves as the rear driving power assembly of the vehicle frame.

8. A vehicle frame, being configured to be connected with a power driving assembly, and provided with a manipulation assembly and a controller for controlling the power driving assembly, wherein after the vehicle frame is connected with the power driving assembly and a communication connection is established between the controller and the power driving assembly, the controller is configured to detect a manipulation instruction from the manipulation assembly, and in response to detecting the manipulation instruction from the manipulation assembly and determining that the manipulation instruction corresponds to the power driving assembly, generate, according to the manipulation instruction, a control instruction for controlling the power driving assembly, and send the control instruction to the power driving assembly, wherein
the vehicle frame is of a frame structure in bridge connection to the front and rear of a vehicle, and is in detachable connection with the power driving assembly which has a self-balancing system;
when the power driving assembly is connected with the vehicle frame, the controller is in wired connection or wireless connection with the power driving assembly, the self-balancing system of the power driving assembly does not operate, and the vehicle is used as a kart;
when the power driving assembly is disconnected from the vehicle frame, the self-balancing system of the power driving assembly operates, and the power driving assembly is used as a self-balancing scooter.

9. The vehicle frame as claimed in claim 8, wherein
the manipulation assembly comprises an accelerator assembly; the accelerator assembly is connected with the controller; the controller is configured to generate, according to an accelerator manipulation instruction from the accelerator assembly, a first control instruction used for controlling power output of the power driving assembly, wherein the first control instruction is used for instructing the power driving assembly to increase the power output;
or,
the manipulation assembly comprises a brake assembly; the brake assembly is connected with the controller; the controller is configured to generate, according to a brake instruction from the brake assembly, a second control instruction used for controlling power output of the power driving assembly, wherein the second control instruction is used for instructing the power driving assembly to reduce the power output;
or,
the manipulation assembly comprises a direction manipulation assembly; the direction manipulation assembly is connected with the controller; the controller is configured to generate, according to a direction manipulation instruction from the direction manipulation assembly, a third control instruction used for controlling power output of the power driving assembly, wherein the third control instruction is used for instructing different drive units in the power driving assembly to provide differential power outputs.

10. The vehicle frame as claimed in claim 8, wherein
the power driving assembly is only connected to a front end of the vehicle frame, and serves as a front driving power assembly of the vehicle frame; or,
the power driving assembly is only connected to a rear end of the vehicle frame, and serves as a rear driving power assembly of the vehicle frame; or,
the power driving assembly connected to the front end of the vehicle frame serves as the front driving power assembly of the vehicle frame, and the power driving assembly connected to the rear end of the vehicle frame serves as the rear driving power assembly of the vehicle frame.

11. A vehicle, comprising a vehicle frame as claimed in claim 8 and a power driving assembly, wherein
the power driving assembly is configured to be connected with a vehicle frame;
the vehicle frame is provided with a manipulation assembly;
a controller for controlling the power driving assembly is set on the vehicle frame or on the power driving assembly;
the power driving assembly comprises: a processor and a power output assembly, wherein after the power driving assembly is connected to the vehicle frame, the power driving assembly enters a first operating mode; when the power driving assembly is in the first operating state, the processor is configured to receive, after establishing communication connection with the controller, a control instruction from the controller, and control power output of the power output assembly according to the received control instruction.

12. A power driving assembly, being configured to be connected with a vehicle frame; the vehicle frame is provided with a manipulation assembly; a controller for controlling the power driving assembly is set on the vehicle frame or on the power driving assembly; the power driving assembly comprises: a processor and a power output assembly, wherein after the power driving assembly is connected to the vehicle frame, the power driving assembly enters a first operating mode; when the power driving assembly is in the first operating state,
the processor is configured to receive, after establishing communication connection with the controller, a control instruction from the controller, and control power output of the power output assembly according to the received control instruction,
wherein
the vehicle frame is of a frame structure in bridge connection to the front and rear of a vehicle, and is in detachable connection with the power driving assembly;
the power driving assembly has a self-balancing system;
when the power driving assembly is connected with the vehicle frame, the controller is in wired connection or wireless connection with the power driving assembly, the self-balancing system of the power driving assembly does not operate, and the vehicle is used as a kart;
when the power driving assembly is disconnected from the vehicle frame, the self-balancing system of the power driving assembly operates, and the power driving assembly is used as a self-balancing scooter.

13. The power driving assembly as claimed in claim 12, wherein after the power driving assembly is disconnected from the vehicle frame, the power driving assembly enters a second operating mode, wherein the second operating mode is different from the first operating mode, and in the second operating mode, the power output assembly does not provide power output for the vehicle frame.

14. The power driving assembly as claimed in claim 13, wherein the power driving assembly has a self-balancing system; in the first operating mode, the self-balancing system of the power driving assembly does not operate, and the power output assembly provides power output for the vehicle frame; and in the second operating mode, the self-balancing system of the power driving assembly operates.

15. The power driving assembly as claimed in claim 12, wherein
the manipulation assembly comprises an accelerator assembly; the processor is configured to receive a first control instruction from the controller, wherein the first control instruction is used for instructing the power output assembly to increase the power output, determine, according to the first control instruction, a power increase strategy of the power output assembly, and control the power output assembly to increase the power output based on the power increase strategy;

or, the manipulation assembly comprises a brake assembly; the processor is configured to receive a second control instruction from the controller, wherein the second control instruction is used for instructing the power output assembly to reduce the power output, determine, according to the second control instruction, a power reduction strategy of the power output assembly, and control the power output assembly to reduce the power output based on the power reduction strategy;

or, the manipulation assembly comprises a direction manipulation assembly; the processor is configured to receive a third control instruction from the controller, wherein the third control instruction is used for instructing different drive units in the power output assembly to provide differential power outputs, determine, according to the third control instruction, a differential power output strategy of the power output assembly, and control the different drive units in the power output assembly to provide the differential power outputs based on the differential power output strategy.

16. The power driving assembly as claimed in claim 12, wherein, the power driving assembly is only connected to a front end of the vehicle frame, and serves as a front driving power assembly of the vehicle frame; or, the power driving assembly is only connected to a rear end of the vehicle frame, and serves as a rear driving power assembly of the vehicle frame; or, the power driving assembly connected to the front end of the vehicle frame serves as the front driving power assembly of the vehicle frame, and the power driving assembly connected to the rear end of the vehicle frame serves as the rear driving power assembly of the vehicle frame.

* * * * *